United States Patent
Sellers et al.

(10) Patent No.: US 11,676,321 B2
(45) Date of Patent: Jun. 13, 2023

(54) GRAPHICS LIBRARY EXTENSIONS

(71) Applicant: Advanced Micro Devices, Inc., Santa Clara, CA (US)

(72) Inventors: Graham Sellers, Orlando, FL (US); Eric Zolnowski, Orlando, FL (US); Pierre Boudier, Los Gatos, CA (US); Juraj Obert, Orlando, FL (US)

(73) Assignee: Advanced Micro Devices, Inc., Santa Clara, CA (US)

(*) Notice: Subject to any disclaimer, the term of this patent is extended or adjusted under 35 U.S.C. 154(b) by 0 days.

(21) Appl. No.: 16/915,340

(22) Filed: Jun. 29, 2020

(65) Prior Publication Data
US 2020/0327715 A1 Oct. 15, 2020

Related U.S. Application Data

(63) Continuation of application No. 15/339,860, filed on Oct. 31, 2016, now Pat. No. 10,699,464, which is a
(Continued)

(51) Int. Cl.
| | |
|---|---|
| G06T 15/10 | (2011.01) |
| G06T 15/80 | (2011.01) |
| G06T 15/00 | (2011.01) |
| G06T 1/00 | (2006.01) |
| G06T 1/20 | (2006.01) |

(Continued)

(52) U.S. Cl.
CPC .............. *G06T 15/005* (2013.01); *G06T 1/00* (2013.01); *G06T 1/20* (2013.01); *G06T 1/60* (2013.01); *G06T 11/40* (2013.01); *G06T 15/10* (2013.01); *G06T 15/80* (2013.01); *G06T 17/20* (2013.01); *G06T 19/20* (2013.01); *G06T 15/04* (2013.01); *G06T 15/30* (2013.01); *G06T 15/40* (2013.01); *G06T 15/503* (2013.01)

(58) Field of Classification Search
CPC ................................. G06T 15/80; G06T 15/10
See application file for complete search history.

(56) References Cited

U.S. PATENT DOCUMENTS

| | | | | |
|---|---|---|---|---|
| 6,476,807 B1* | 11/2002 | Duluk, Jr. | ................. | G06T 1/60 345/421 |
| 7,184,040 B1* | 2/2007 | Tzvetkov | .............. | G06T 15/005 345/419 |

(Continued)

OTHER PUBLICATIONS

Riccio, Christophe, "GL_AMD_sparse_texture_comments"; G-TRuc Creation; Apr. 11, 2012; XP002711385; Retrieved from the internet Aug. 16, 2013; the whole document—3 pages; downloaded from Espacenet.com, Feb. 19, 2014. URL:http://www.g-truc.net/post-0516.html.

(Continued)

*Primary Examiner* — Matthew Salvucci
(74) *Attorney, Agent, or Firm* — Volpe Koenig

(57) ABSTRACT

A method and system for performing graphics processing is provided. The method and system includes storing stencil buffer values in a stencil buffer; generating either or both of a reference value and a source value in a fragment shader; comparing the stencil buffer values against the reference value; and processing a fragment based on the comparing the stencil buffer values against the reference value.

10 Claims, 3 Drawing Sheets

Related U.S. Application Data continuation of application No. 13/912,946, filed on Jun. 7, 2013, now Pat. No. 10,019,829.

(60) Provisional application No. 61/657,290, filed on Jun. 8, 2012.

(51) Int. Cl.
| | | |
|---|---|---|
| *G06T 1/60* | (2006.01) | |
| *G06T 11/40* | (2006.01) | |
| *G06T 17/20* | (2006.01) | |
| *G06T 19/20* | (2011.01) | |
| G06T 15/04 | (2011.01) | |
| G06T 15/30 | (2011.01) | |
| G06T 15/40 | (2011.01) | |
| G06T 15/50 | (2011.01) | |

(56) References Cited

U.S. PATENT DOCUMENTS

| 8,212,825 B1 | 7/2012 | Everitt | |
|---|---|---|---|
| 2008/0225049 A1* | 9/2008 | Fowler | G06T 15/40 |
| | | | 345/422 |
| 2011/0063294 A1 | 3/2011 | Brown | |
| 2011/0157207 A1 | 6/2011 | Hall et al. | |
| 2011/0285747 A1* | 11/2011 | Kilgard | G06T 11/203 |
| | | | 345/613 |
| 2015/0097846 A1 | 4/2015 | Fridman | |

OTHER PUBLICATIONS

Mayer, Albert Julian, "Virtual Texturing"; Technische Universität Wien; Oct. 14, 2010; XP002711384; Retrieved from the internet Aug. 16, 2013; 113 pages. URL:http://www.cg.tuwien.ac.at/research/publications/2010/Mayer-2010-VT/Mayer-2010-VT-Thesis.pdf.

Sellers, G. et al., "AMD Sparse Texture" Mar. 27, 2012, 19pgs. (Retrieved from: https://www.opengl.org/registry/specs/AMD/sparse_texture.txt).

Robert, "Partially Resident Textures_AMD_sparse_texture", Mar. 21, 2012, 2 pages.

Lichtenbelt et al., AMD_sparse_texture, Mar. 23, 2010, <https://www.khronos.org/registry/OpenGL/extensions/ARB/ARB_transform_feedback3.txt>, pp. 1-23 (Year: 2010).

* cited by examiner

GRAPHICS LIBRARY EXTENSIONS

CROSS REFERENCE TO RELATED APPLICATIONS

This application is a continuation of U.S. patent application Ser. No. 15/339,860, filed Oct. 31, 2016, which is a continuation of U.S. patent application Ser. No. 13/912,946, filed Jun. 7, 2013, which claims the benefit of U.S. Provisional Application No. 61/657,290 filed Jun. 8, 2012, the contents of which are hereby incorporated by reference herein.

TECHNICAL FIELD

The disclosed embodiments are generally directed to processing, and in particular, to graphics processing.

BACKGROUND

OpenGL® is a 2D and 3D graphics application programming interface (API). It enables developers of software to create high-performance, visually compelling graphics software applications and exposes all the features of the latest graphics hardware. OpenGL® Extensions are a formal method for exposing new functionality without a major API update. It allows hardware vendors to innovate without relying on a third party, provides a path from experimental feature to fully ratified industry standard and allows software developers to leverage new features without major overhaul.

SUMMARY OF EMBODIMENTS OF THE INVENTION

Methods for enabling graphics features in processors are described herein. Methods are provided to enable trinary built-in functions in the shader, allow separation of the graphics processor's address space from the requirement that all textures must be physically backed, enable use of a sparse buffer allocated in virtual memory, allow a reference value used for stencil test to be generated and exported from a fragment shader, provide support for use specific operations in the stencil buffers, allow capture of multiple transform feedback streams, allow any combination of streams for rasterization, allow a same set of primitives to be used with multiple transform feedback streams as with a single stream, allow rendering to be directed to layered framebuffer attachments with only a vertex and fragment shader present, allow geometry to be directed to one of an array of several independent viewport rectangles without a geometry shader and define an interface that allows improved control of the physical memory used by the graphics device.

BRIEF DESCRIPTION OF THE DRAWINGS

A more detailed understanding may be had from the following description, given by way of example in conjunction with the accompanying drawings wherein.

DETAILED DESCRIPTION

Methods for enabling graphics features in processors are described herein. Methods are provided to enable trinary built-in functions in the shader, allow separation of the graphics processor's address space from the requirement that all textures must be physically backed, enable use of a sparse buffer allocated in virtual memory, allow a reference value used for stencil test to be generated and exported from a fragment shader, provide support for use specific operations in the stencil buffers, allow capture of multiple transform feedback streams, allow any combination of streams for rasterization, allow a same set of primitives to be used with multiple transform feedback streams as with a single stream, allow rendering to be directed to layered framebuffer attachments with only a vertex and fragment shader present, allow geometry to be directed to one of an array of several independent viewport rectangles without a geometry shader and define an interface that allows improved control of the physical memory used by the graphics device.

Figure 1:
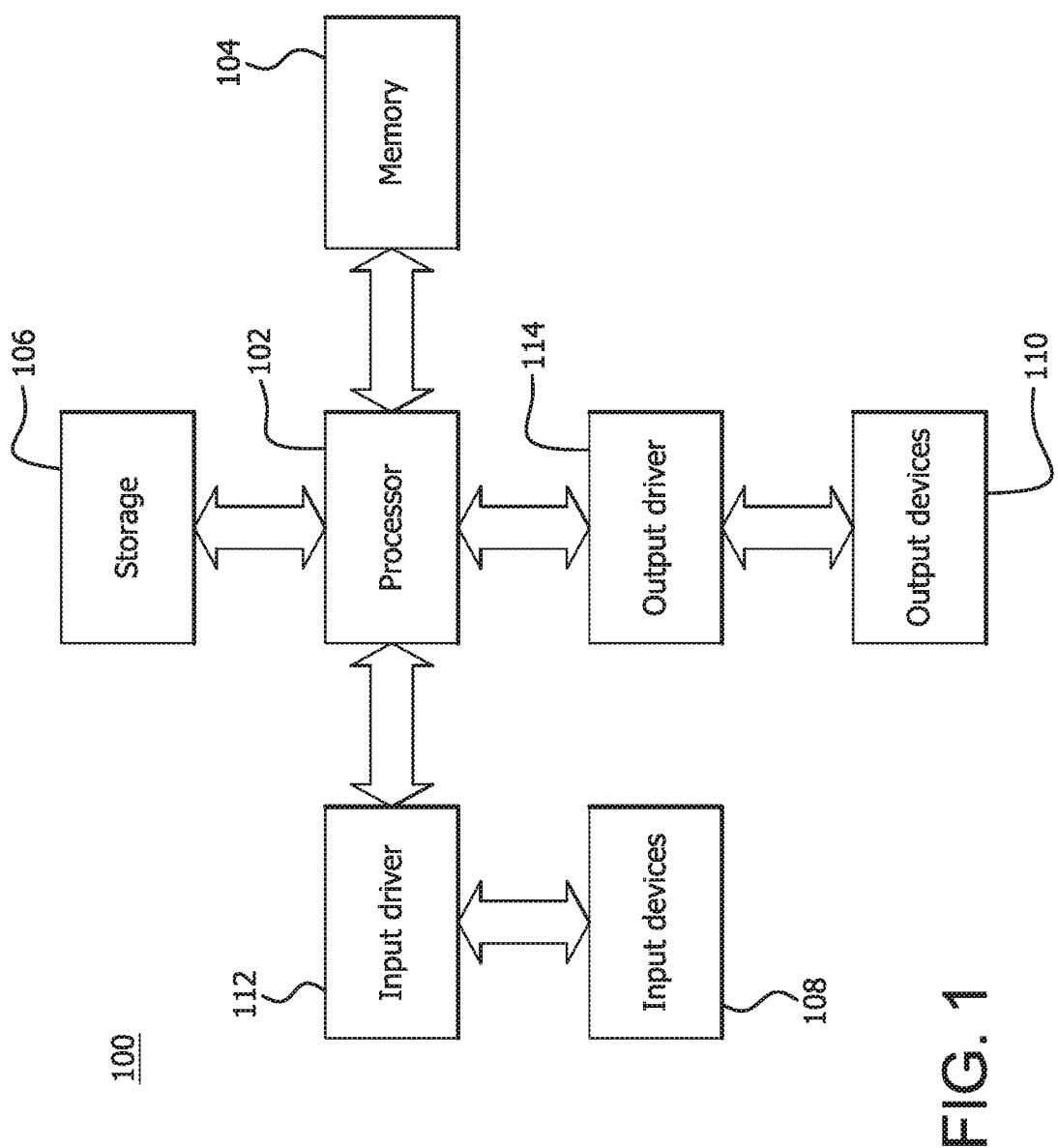
FIG. 1 is a block diagram of an example device in which one or more disclosed embodiments may be implemented.

FIG. 1 is a block diagram of an example device 100 in which one or more disclosed embodiments may be implemented. The device 100 may include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU. The memory 104 may be located on the same die as the processor 102, or may be located separately from the processor 102. The memory 104 may include a volatile or non-volatile memory, for example, random access memory (RAM), dynamic RAM, or a cache.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Computers and other such data processing devices have at least one control processor that is generally known as a CPU. Such computers and processing devices operate in environments which can typically have memory, storage, input devices and output devices. Such computers and processing devices can also have other processors such as GPUs that are used for specialized processing of various types and may be located with the processing devices or externally, such as, included the output device. For example, GPUs are designed to be particularly suited for graphics processing operations. GPUs generally comprise multiple processing elements that are ideally suited for executing the same instruction on parallel data streams, such as in data-parallel processing. In general, a CPU functions as the host or controlling processor and hands-off specialized functions such as graphics processing to other processors such as GPUs.

With the availability of multi-core CPUs where each CPU has multiple processing cores, substantial processing capabilities that can also be used for specialized functions are available in CPUs. One or more of the computation cores of multi-core CPUs or GPUs can be part of the same die (e.g., AMD Fusion™) or in different dies (e.g., Intel Xeon™ with NVIDIA GPU). Recently, hybrid cores having characteristics of both CPU and GPU (e.g., CellSPE™, Intel Larrabee™) have been generally proposed for General Purpose GPU (GPGPU) style computing. The GPGPU style of computing advocates using the CPU to primarily execute control code and to offload performance critical data-parallel code to the GPU. The GPU is primarily used as an accelerator. The combination of multi-core CPUs and GPGPU computing model encompasses both CPU cores and GPU cores as accelerator targets. Many of the multi-core CPU cores have performance that is comparable to GPUs in many areas. For example, the floating point operations per second (FLOPS) of many CPU cores are now comparable to that of some GPU cores.

Embodiments described herein may yield substantial advantages by enabling the use of the same or similar code base on CPU and GPU processors and also by facilitating the debugging of such code bases. While the present invention is described herein with illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Embodiments described herein may be used in any computer system, computing device, entertainment system, media system, game systems, communication device, personal digital assistant, or any system using one or more processors. The present invention is particularly useful where the system comprises a heterogeneous computing system. A "heterogeneous computing system," as the term is used herein, is a computing system in which multiple kinds of processors are available. An example heterogeneous computing system 100 is shown in FIG. 1. Heterogeneous computing system 100 can include one or more processing units, such as processor 102. Heterogeneous computing system 100 can also include at least one system memory 104, at least one persistent storage device 106, at least one input device 108 and output device 110.

Embodiments described herein enable the same code base to be executed on different processors, such as GPUs and CPUs. Embodiments of the present invention, for example, can be particularly advantageous in processing systems having multi-core CPUs, and/or GPUs, because code developed for one type of processor can be deployed on another type of processor with little or no additional effort. For example, code developed for execution on a GPU, also known as GPU-kernels, can be deployed to be executed on a CPU, using embodiments of the present invention.

Figure 2:
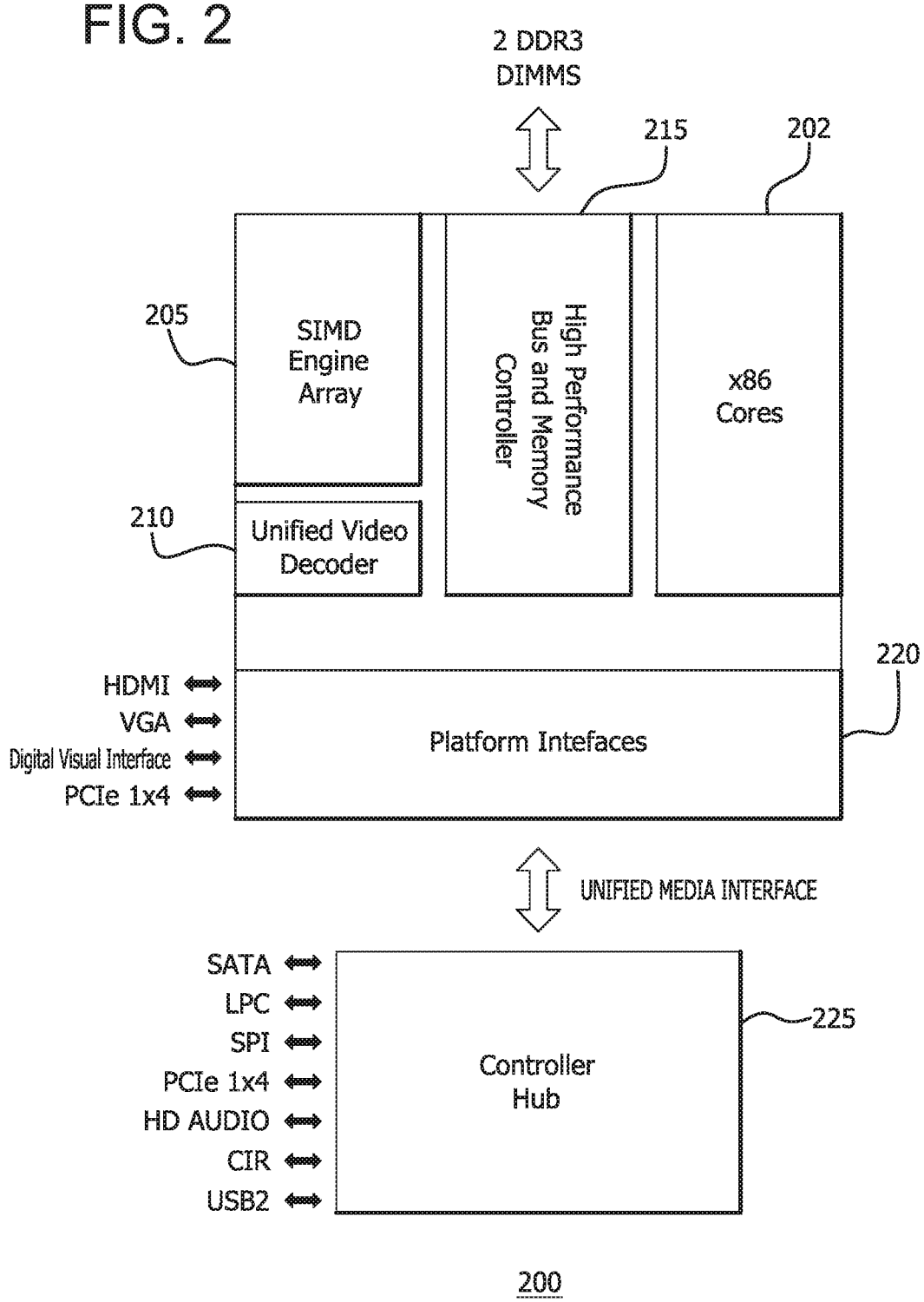
FIG. 2 is another block diagram of an example device in which one or more disclosed embodiments may be implemented.

FIG. 2 shows an example heterogeneous processing unit 200 which may include accelerated processing units (APUs). A heterogeneous processing unit 200 includes one or more CPUs and one or more GPUs 202, including a wide single instruction, multiple data (SIMD) processor 205 and unified video decoder 210 that performs functions previously handled by a discrete GPU. Heterogeneous processing units 200 can also include at least one memory controller 215 for accessing system memory and that also provides memory shared between CPUs and GPU 202 and a platform interface 220 for handling communication with input and output devices and interacting with a controller hub. The SIMD processor 205 may be included to provide a heterogenous GPU capability in accordance with some embodiments or a discrete GPU may be included separated from the CPU to implement some embodiments.

OpenGL® is a 2D and 3D graphics application programming interface (API). It enables developers of software to create high-performance, visually compelling graphics software applications and exposes all the features of the latest graphics hardware.

Figure 3:
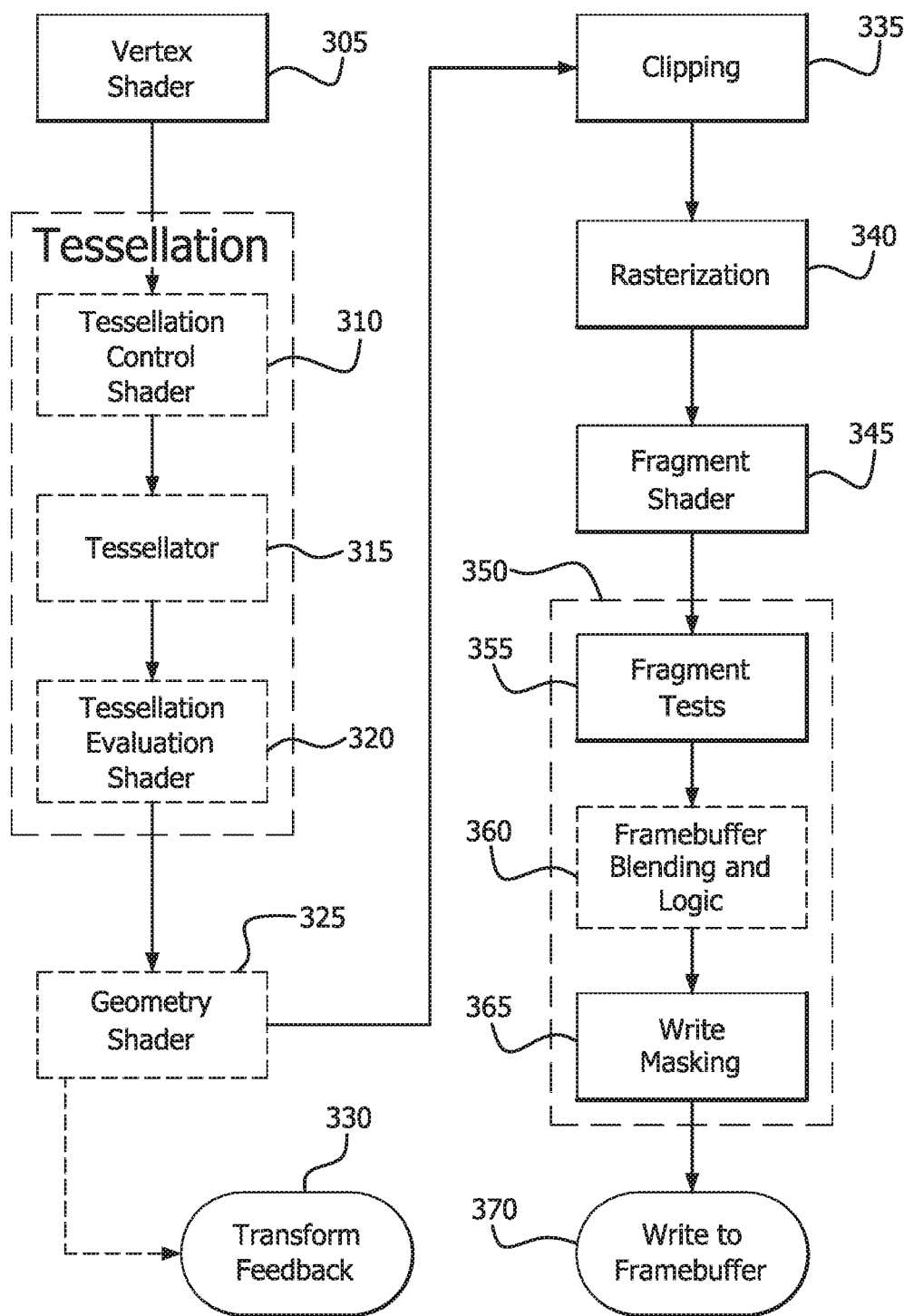
FIG. 3 is an example rendering pipeline in which one or more disclosed embodiments may be implemented.

FIG. 3 is an illustrative OpenGL rendering pipeline 300 for rendering objects. The process of vertex specification (pre-pipeline) is where the application sets up an ordered list of vertices from a 3D model, for example, to send to the pipeline. These vertices define the boundaries of a primitive. Primitives are basic drawing shapes, like triangles, lines, and points. This part of the pipeline deals with a number of objects like Vertex Array Objects and Vertex Buffer Objects. Vertex Array Objects define what data each vertex has and Vertex Buffer Objects store the actual vertex data. Each vertex pulled from the source data must be processed. This is the responsibility of a vertex shader 305, which receives attribute inputs of the vertices and converts each incoming vertex into a single outgoing vertex based on an arbitrary, user-defined program.

Primitive assembly is the process of collecting a run of vertex data output from the vertex shader and composing it into a viable primitive. The type of primitive the user rendered with determines how this process works. The output of this process is an ordered sequence of simple primitives (lines, points, or triangles).

Primitives can be tessellated using two shader stages, a tessellation control shader 310 and a tessellation evaluation shader 320, with a fixed-function tessellator 315 between the tessellation control shader 310 and tessellation evaluation shader 320.

In addition to the usual primitive assembly step, a geometry shader 325 may be used that processes each incoming primitive, returning zero or more output primitives. The input primitives for the geometry shader 325 are the output primitives from primitive assembly.

The outputs of the geometry shader or primitive assembly are written to a series of buffer objects that allows the user to do transform data via vertex and geometry shaders, then hold on to that data for use later. This is called transform feedback mode 330. The data output into the transform feedback buffer is the data from each primitive emitted by this step.

The primitives are then clipped and appropriate culling is done (335). Clipping means that primitives that lie on the boundary between the inside of the viewing volume and the outside are split into several primitives. An implementation is also quite free to immediately cull any primitive that is not within the viewing region, or is completely within the boundary of a clipping plane. The vertex positions are transformed from clip-space to window space via the Perspective Divide and the Viewport Transform.

Primitives are then rasterized in the order in which they were given (340). The result of rasterizing a primitive is a sequence of fragments. A fragment is a set of state that is used to compute the final data for a pixel (or sample if multisampling is enabled) in the output framebuffer. The state for a fragment includes its position in screen-space, the sample coverage if multisampling is enabled, and a list of arbitrary data that was output from the previous vertex or geometry shader. This last set of data is computed by interpolating between the data values in the vertices for the fragment. The style of interpolation is defined by the shader that outputted those values.

The data for each fragment from the rasterization stage is processed by a fragment shader 345. The output from a fragment shader is a list of colors for each of the color buffers being written to, a depth value, and a stencil value.

The fragment data output from the fragment processor is then passed through a sequence of steps (350). Various culling tests may be applied to the fragment data output (355). The stencil test, if any, is performed. If it fails, then the fragment is culled and not added to the framebuffer. The depth test, if any, is performed. If it fails, then the fragment is culled and not added to the framebuffer. If any of these tests fail, the fragment is culled and not added to the framebuffer. After the culling tests are applied, framebuffer blending and logic operations are applied to each fragment (360). For each fragment color value, there is a specific blending operation between it and the color already in the framebuffer at that location. Masking operations allow the user to prevent writes to certain values (365). Color, depth, and stencil writes can be masked on and off. Individual color channels can be masked as well. The fragment data is then written to the framebuffer (370).

The methods described herein are extensions in the parlance of OpenGL® and can be used with the OpenGL core. Extensions may be used via direct access through operating system (OS) provided libraries. They may also be used by employing an OpenGL loader and providing entry points for the extension as shown for example in Table 1.

TABLE 1

```
#include <GL3/gl3w.h>
#include <GL/gl3.h>
void main(void)
{
    // Initialize gl3w
    gl3wInit( );
    // Check version support
    if (gl3wIsSupported(4, 0))
    {
        printf("Too bad, you don't have OpenGL 4.x support!\n");
        return;
    }
    // Get entry point in our extension
    PFNGLFUNCTAMD glFuncAMD = (PFNFUNCAMD)gl3wGetProcAddress("glFunc");
    // Render!
    mainRenderingLoop( );
}
```

One example method or extension is the shader_trinary_minmax. This extension introduces three new trinary built-in functions to the OpenGL Shading Languages. These functions allow the minimum, maximum or median of three inputs to be found with a single function call. These operations may be useful for sorting and filtering operations, for example. An example syntax is shown in Table 2. The shader_trinary_minmax may be used, for example, to sort a set of values as shown in Table 3.

TABLE 2

| Syntax | Description |
|---|---|
| genType min3(genType x, genType y, genType z) | Returns the minimum value of x, y, and z |
| genIType min3(genIType x, genIType y, genIType z) | Returns the minimum value of x, y, and z |
| genUType min3(genUType x, genUType y, genUType z) | Returns the minimum value of x, y, and z |
| genType max3(genType x, genType y, genType z) | Returns the maximum value of x, y, and z |
| genIType max3(genIType x, genIType y, genIType z) | Returns the maximum value of x, y, and z |
| genUType max3(genUType x, genUType y, genUType z) | Returns the maximum value of x, y, and z |
| genType mid3(genType x, genType y, genType z) | Returns the median value of x, y, and z |
| genIType mid3(genIType x, genIType y, genIType z) | Returns the median value of x, y, and z |
| genUType mid3(genUType x, genUType y, genUType z) | Returns the median value of x, y, and z |

TABLE 3

```
void sort3(vec4 a, vec4 b, vec4 c,
        out vec4 first, out vec4 second, out vec4 third)
{
    first = min3(a, b, c);
    second = mid3(a, b, c);
    third = max3(a, b, c);
}
```

Another example method or extension is sparse_texture. Recent advances in application complexity and a desire for higher resolutions have pushed texture sizes up considerably. Often, the amount of physical memory available to a graphics processor is a limiting factor in the performance of texture-heavy applications. Once the available physical memory is exhausted, paging may occur, which brings performance down considerably—or worse, the application may fail. Nevertheless, the amount of address space available to the graphics processor has increased to the point where many gigabytes—or even terabytes of address space may be usable even though that amount of physical memory is not present.

The sparse_texture extension allows the separation of the graphics processor's address space (reservation) from the requirement that all textures must be physically backed (commitment). This exposes a limited form of virtualization for textures. Use cases include sparse (or partially resident) textures, texture paging, on-demand and delayed loading of texture assets and application controlled level of detail. See Table 4 for new functions and tokens that are used in the sparse_texture extension.

RAY or TEXTURE_3 D for a one-dimensional texture, one-dimensional array texture, two-dimensional texture, rectangular texture, two-dimensional array texture, cube-map texture, cube-map array texture, or three-dimensional texture, respectively.

The <width>, <height>, and <depth> parameters determine the size of the allocated texture. When <target> parameter is TEXTURE_1D or TEXTURE_1D_ARRAY, <height> and <depth> parameters must be 1. When <target> parameter is TEXTURE_2 D, TEXTURE_RECTANGLE or TEXTURE_2D_ARRAY, <depth> parameter must be 1. When <target> parameter is TEXTURE_CUBE_MAP or TEXTURE_CUBE_MAP_ARRAY, <width>, <height> and <depth> parameters must be equal. For the non-array targets (TEXTURE_1D, TEXTURE_2_D, TEXTURE_CUBE_MAP and TEXTURE_3_D), <layers> parameters must be 1, otherwise it specifies the number of layers in the array. The <internalFormat> parameter specifies the internal storage format for the texture data and must be one of the sized internal formats listed in Table 3.12.

The <width> and <height> parameters must be less than or equal to the value of MAX_SPARSE_TEXTURE_SIZE_AMD, and <depth> parameter must be less than or equal to the value of MAX_SPARSE_3D_TEXTURE_SIZE_AMD. <layers> parameter must be less than or equal to the value of MAX_SPARSE_ARRAY_TEXTURE_LAYERS_AMD. The <flags> parameter contains a bitfield that is used to control the allocation strategy used for the texture.

If <flags> parameter contains TEXTURE_STORAGE_SPARSE_BIT_AMD, storage is reserved for the texture

TABLE 4

```
void TexStorageSparseAMD(enum target,
        enum internalFormat,
        sizei width,
        sizei height,
        sizei depth,
        sizei layers,
        bitfield flags);
void TextureStorageSparseAMD(uint texture,
        enum target,
        enum internalFormat,
        sizei width,
        sizei height,
        sizei depth,
        sizei layers,
        bitfield flags);
```
New Tokens
    Accepted by the <flags> parameter to TexStorageSparseAMD and TextureStorageSparseAMD:
        TEXTURE_STORAGE_SPARSE_BIT_AMD    0x00000001
    Accepted by the <pname> parameter to GetInternalformativ:
        VIRTUAL_PAGE_SIZE_X_AMD    0x9195
        VIRTUAL_PAGE_SIZE_Y_AMD    0x9196
        VIRTUAL_PAGE_SIZE_Z_AMD    0x9197
    Accepted by the <pname> parameter to GetIntegerv, GetFloatv, GetDoublev,
    GetInteger64v, and GetBooleanv:
        MAX_SPARSE_TEXTURE_SIZE_AMD    0x9198
        MAX_SPARSE_3D_TEXTURE_SIZE_AMD    0x9199
        MAX_SPARSE_ARRAY_TEXTURE_LAYERS    0x919A
    Accepted by the <pname> parameter of GetTexParameter{if}v:
        MIN_SPARSE_LEVEL_AMD    0x919B
    Accepted by the <pname> parameter of TexParameter{if}{v} and
    GetTexParameter{if}v:
        MIN_LOD_WARNING_AMD    0x919C The Texture Storage Allocation command in Table 4 (first command) is used to specify the storage requirements for a texture object. The <target> parameter must be one of TEXTURE_1D, TEXTURE_1D_ARRAY, TEXTURE_2D, TEXTURE_RECTANGLE, TEXTURE_2D_ARRAY, TEXTURE_CUBE_MAP, TEXTURE_CUBE_MAP_ARdata, but not committed immediately. Otherwise, storage is both reserved and committed at time of specification. If the texture is marked as sparse, (and storage is therefore uncommitted), storage for the texture data is committed on later specification through commands such as TexSubImage1D, TexSubImage2D or CopyTexSubImage2D.

Texture image stores allocated via calls to TextStorageSparseAMD are always considered complete, whether or not physical backing store for all mipmap levels has been allocated.

The TextureStorageSparseAMD command operates identically to the TexStorageSparseAMD command except, rather than specifying storage requirements for the current bound texture for the texture unit indicated by the current active texture state and the target parameter, this command specifies storage requirements for the texture object named by the initial texture parameter. The error INVALID_VALUE is generated if <texture> parameter is zero.

Described herein is texture storage commitment and decommitment. For texture images allocated by calling TexStorageSparseAMD or TextureStorageSparseAMD with a <flags> parameter which contains the TEXTURE_STORAGE_SPARSE_BIT_AMD, physical storage for the underlying texture data may not yet be committed. Commitment is made by calling TexSubImage1D, TexSubImage2D, TexSubImage3D, with <data> parameter containing a value other than NULL. When such a command is encountered, physical storage for the specified region of the texture is committed and the data becomes resident. If <data> parameter is NULL and no buffer is bound to the PIXEL_UNPACK_BUFFER binding, then the data corresponding to the specified region is decommitted and released to the GL. If a buffer is bound to the PIXEL_UNPACK_BUFFER binding point, then <data> parameter is interpreted as normal—that is, if <data> parameter is NULL, then it indicates an offset of zero into that buffer's data store.

Compressed texture data may be specified by calling CompressedTexSubImage1D, CompressedTexSubImage2D or CompressedTexSubImage3D. Again, physical pages are allocated on demand when <data> parameter is non-NULL and freed when <data> parameter is NULL and no buffer is bound to the PIXEL_UNPACK_BUFFER binding point. The origin and size of committed regions must be integer multiples of the virtual page size in each dimension as appropriate for the specified level of the specified texture. The virtual page size for a sparse_texture may be determined by calling GetInternalformativ with <pname> parameter set to VIRTUAL_PAGE_SIZE_X_AMD, VIRTUAL_PAGE_SIZE_Y_AMD or VIRTUAL_PAGE_SIZE_Z_AMD to query the X, Y or Z dimension of the page size, respectively. Calling TexSubImage* or CopyTexSubImage* with <width>, <height> (for 2D and 3D textures) or <depth> (for 3D textures) parameters not set to integer multiples of VIRTUAL_PAGE_SIZE_X_AMD, VIRTUAL_PAGE_SIZE_Y_AMD or VIRTUAL_PAGE_SIZE_Z_AMD, respectively, will generate an INVALID_VALUE error. An INVALID_VALUE error is also generated if <xoffset>, <yoffset> (for 2D and 3D textures) or <zoffset> (for 3D textures) parameters is not a multiple of VIRTUAL_PAGE_SIZE_X_AMD, VIRTUAL_PAGE_SIZE_Y_AMD or VIRTUAL_PAGE_SIZE_Z_AMD, respectively.

Calling TexStorageSparseAMD or TextureStorageSparseAMD on an already committed texture decommits any associated storage and, if <flags> parameter contains TEXTURE_STORAGE_SPARSE_BIT_AMD, returns the image store to fully uncommitted. Likewise, calling one of the TexImage commands reallocates the storage for the texture image data and commits it immediately.

When storage is committed for texture levels greater than or equal to the value of MIN_SPARSE_LEVEL_AMD for a sparse_texture, all levels greater than or equal to that level become committed. The value of MIN_SPARSE_LEVEL_AMD may be retrieved by calling GetTexParameter{if}v with <pname> parameter set to MIN_SPARSE_LEVEL_AMD. Sampling from a committed level of a texture that has not yet had data specified produces undefined results, but will not result in instability or program termination.

Described herein are effects of texture commitment on completeness. Texture images whose storage was allocated without commitment, (by calling TexStorageSparseAMD or TextureStorageSparseAMD with a <flags> parameter containing TEXTURE_STORAGE_SPARSE_BIT_AMD), are always considered complete, regardless of their commitment status. Using such a texture image as the source for rendering operations produces results as described in sections XXX and XXX of the OpenGL Specification and section XXX of the OpenGL Shading Language specification.

Described herein are user-specified level of detail (LOD) warning thresholds. In addition to detecting attempts to read from uncommitted regions of a sparse texture, the GL can also signal to the shader that it required texels that reside at LODs below some user specified threshold. This may be used, for example, to specify a watermark and to provide feedback to an application before it attempts to fetch from uncommitted texture regions. Any attempt to fetch from lower LOD than the user-specified LOD warning level will generate an LOD warning, which may be detected in the shader by calling the sparseTexelMinLodWarning built-in function. When this function returns <true>, the sparseTexelLodWarningFetch function may be called to determine the requested LOD that generated this warning. If the data representing this LOD is resident, the texture read will still return valid texel data.

To specify the user-defined LOD watermark for a texture, call TexParameteri with <target> parameter set to a valid texture target, and with <pname> parameter set to MIN_LOD_WARNING_AMD. Setting MIN_LOD_WARNING_AMD to zero effectively disables the warning.

Described herein is uncommitted texture images. If a standard texture function is used to sample from a region of a texture image where storage is uncommitted, undefined data is returned to the shader, (although no instability results). If the application can guarantee that this will not occur, (such as when well defined texture coordinates are used with a texture atlas, for example), then standard texturing functions may be used with partially resident textures. If there is a possibility that at the time of use, data in the texture may be non-resident (uncommitted), one of the sparse texture functions may be used to determine the residency status of the data.

The use of partially resident textures allows for tighter integration between virtual memory system and texture units. This is accomplished by exposing residency information to the shaders using the sparse_texture extension. This allows for the propagation of acknowledgement/non-acknowledgement signals from the memory controller to the shader cores and provides well defined behavior for access to non-resident memory pages. Residency information may be sent to shaders using new OpenGL shading language (GLSL) texture functions. Examples for partially resident texture usage is shown in Table 5.

TABLE 5

Create PRT:
GLuint tex;
glGenTextures(1, &tex);
glTextureStorageSparseAMD(tex, GL_TEXTURE_2D, 8192, 8192, 1, 0, GL_TEXTURE_STORAGE_SPARSE_AMD);

TABLE 5-continued

```
Bind to use:
glBindTexture(GL_TEXTURE_2D, tex);
Read in shader as normal:
out vec4 color;
uniform sampler2D prt;
color = texture(prt, texcoord);
Retrieve residency information using new built-in functions:
int code;
code = sparseTexture(prt, texcoord, color);
if ( !sparseTexelResident(code) )
{
    // Handle non-resident case
}
```

The sparse texture functions return a condition code indicating the success of a texel fetch operation. If texture data is present at the sampled location, the texture data is returned in the <texel> inout parameter and the function returns zero. If texture data is not present at the sampled location, <texel> is unmodified and the function returns a non-zero status code. It is then the responsibility of the shader to determine the appropriate course of action. See Tables 6-7 for functions of the sparse_texture extension and Tables 8-9 for textures, (state per texture object).

TABLE 6

Sparse texture lookup functions:

| Syntax | Description |
|---|---|
| int sparseTexture(gsampler1D sampler, float P, inout gvec4 texel [, float bias]); | Behave as in texture( ), but with data returned in <texel> and a status code produced as the return value of the function. |
| int sparseTexture(gsampler2D sampler, vec2 P, inout gvec4 texel [, float bias]); | |
| int sparseTexture(gsampler2DRect sampler, vec2 P, inout gvec4 texel [, float bias]); | |
| int sparseTexture(gsampler3D sampler, vec3 P, inout gvec4 texel [, float bias]); | |
| int sparseTexture(gsampler1DArray sampler, vec2 P, inout gvec4 texel [, float bias]); | |
| int sparseTexture(gsampler2DArray sampler, vec3 P, inout gvec4 texel [, float bias]); | |
| int sparseTexture(gsamplerCube sampler, vec3 P, inout gvec4 texel [, float bias]); | |
| int sparseTexture(gsamplerCubeArray sampler, vec4 P, inout gvec4 texel [, float bias]); | |
| int sparseTextureProj(gsampler1D sampler, vec2 P, inout gvec4 texel [, float bias]); | Behave as in textureProj( ), but with data returned in <texel> and a status code produced as the return value of the function. |
| int sparseTextureProj(gsampler1D sampler, vec4 P, inout gvec4 texel [, float bias]); | |
| int sparseTextureProj(gsampler2D sampler, vec3 P, inout gvec4 texel [, float bias]); | |
| int sparseTextureProj(gsampler2DRect sampler, vec3 P, inout gvec4 texel [, float bias]); | |
| int sparseTextureProj(gsampler2D sampler, vec4 P, inout gvec4 texel [, float bias]); | |

TABLE 6-continued

| | |
|---|---|
| int sparseTextureProj(gsampler2DRect sampler,<br>  vec4 P,<br>  inout gvec4 texel [, float bias]); | |
| int sparseTextureProj(gsampler3D sampler,<br>  vec4 P,<br>  inout gvec4 texel [, float bias]); | |
| int sparseTextureLod(gsampler1D sampler,<br>  float P, float lod,<br>  inout gvec4 texel); | Behave as in textureLod( ), but with data returned in <texel> and a status code produced as the return value of the function. |
| int sparseTextureLod(gsampler2D sampler,<br>  vec2 P, float lod,<br>  inout gvec4 texel); | |
| int sparseTextureLod(gsampler3D sampler,<br>  vec3 P, float lod,<br>  inout gvec4 texel); | |
| int sparseTextureLod(gsampler1DArray sampler,<br>  vec2 P, float lod,<br>  inout gvec4 texel); | |
| int sparseTextureLod(gsampler2DArray sampler,<br>  vec3 P, float lod,<br>  inout gvec4 texel); | |
| int sparseTextureLod(gsamplerCube sampler,<br>  vec3 P, float lod,<br>  inout gvec4 texel); | |
| int sparseTextureLod(gsamplerCubeArray sampler,<br>  vec4 P, float lod,<br>  inout gvec4 texel); | |
| int sparseTextureOffset(gsampler1D sampler,<br>  float P, int offset,<br>  inout gvec4 texel [, float bias]); | Behave as in textureOffset( ), but with data returned in <texel> and a status code produced as the return value of the function. |
| int sparseTextureOffset(gsampler2D sampler,<br>  vec2 P, ivec2 offset,<br>  inout gvec4 texel [, float bias]); | |
| int sparseTextureOffset(gsampler3D sampler,<br>  vec3 P, ivec3 offset,<br>  inout gvec4 texel [, float bias]); | |
| int sparseTextureOffset(gsampler1DArray sampler,<br>  vec2 P, int offset,<br>  inout gvec4 texel [, float bias]); | |

TABLE 6-continued

```
| int sparseTextureOffset(gsampler2DArray sampler,         |                                           |
|         vec3 P, ivec2 offset,                            |                                           |
|         inout gvec4 texel [, float bias]);               |                                           |
+----------------------------------------------------------+-------------------------------------------+
| int sparseTextureProjOffset(gsampler1D sampler,          | Behave as in textureProjOffset( ), but    |
|         vec2 P, int offset,                              | with data returned in <texel> and a       |
|         inout gvec4 texel [, float bias]);               | status code produced as the return value |
|                                                          | of the function.                          |
| int sparseTextureProjOffset(gsampler1D sampler,          |                                           |
|         vec4 P, int offset,                              |                                           |
|         inout gvec4 texel [, float bias]);               |                                           |
| int sparseTextureProjOffset(gsampler2D sampler,          |                                           |
|         vec3 P, ivec2 offset,                            |                                           |
|         inout gvec4 texel [, float bias]);               |                                           |
| int sparseTextureProjOffset(gsampler2D sampler,          |                                           |
|         vec4 P, ivec2 offset,                            |                                           |
|         inout gvec4 texel [, float bias]);               |                                           |
| int sparseTextureProjOffset(gsampler3D sampler,          |                                           |
|         vec4 P, ivec3 offset,                            |                                           |
|         inout gvec4 texel [, float bias]);               |                                           |
+----------------------------------------------------------+-------------------------------------------+
| int sparseTextureLodOffset(gsampler1D sampler,           | Behave as in textureLodOffset( ), but     |
|         float P, float lod, int offset,                  | with data returned in <texel> and a       |
|         inout gvec4 texel);                              | status code produced as the return value |
|                                                          | of the function.                          |
| int sparseTextureLodOffset(gsampler2D sampler,           |                                           |
|         vec2 P, float lod, ivec2 offset,                 |                                           |
|         inout gvec4 texel);                              |                                           |
| int sparseTextureLodOffset(gsampler3D sampler,           |                                           |
|         vec3 P, float lod, ivec3 offset,                 |                                           |
|         inout gvec4 texel);                              |                                           |
| int sparseTextureLodOffset(gsampler1DArray sampler,      |                                           |
|         vec2 P, float lod, int offset,                   |                                           |
|         inout gvec4 texel);                              |                                           |
| int sparseTextureLodOffset(gsampler2DArray sampler,      |                                           |
|         vec3 P, float lod, ivec2 offset,                 |                                           |
|         inout gvec4 texel);                              |                                           |
+----------------------------------------------------------+-------------------------------------------+
| int sparseTextureProjLod(gsampler1D sampler,             | Behave as in textureProjLod( ), but       |
|         vec2 P, float lod,                               | with data returned in <texel> and a       |
|         inout gvec4 texel);                              | status code produced as the return value |
|                                                          | of the function.                          |
| int sparseTextureProjLod(gsampler1D sampler,             |                                           |
|         vec4 P, float lod,                               |                                           |
|         inout gvec4 texel);                              |                                           |
```

TABLE 6-continued

| | |
|---|---|
| int sparseTextureProjLod(gsampler2D sampler,<br>    vec3 P, float lod,<br>    inout gvec4 texel); | |
| int sparseTextureProjLod(gsampler2D sampler,<br>    vec4 P, float lod,<br>    inout gvec4 texel); | |
| int sparseTextureProjLod(gsampler3D sampler,<br>    vec4 P, float lod,<br>    inout gvec4 texel); | |
| int sparseTextureProjLodOffset(gsampler1D sampler,<br>    vec2 P, float lod, int offset,<br>    inout gvec4 texel); | Behave as in textureProjLodOffset( ), but<br>with data returned in <texel> and a<br>status code produced as the return value<br>of the function. |
| int sparseTextureProjLodOffset(gsampler1D sampler,<br>    vec4 P, float lod, int offset,<br>    inout gvec4 texel); | |
| int sparseTextureProjLodOffset(gsampler2D sampler,<br>    vec3 P, float lod, ivec2 offset,<br>    inout gvec4 texel); | |
| int sparseTextureProjLodOffset(gsampler2D sampler,<br>    vec4 P, float lod, ivec2 offset,<br>    inout gvec4 texel); | |
| int sparseTextureProjLodOffset(gsampler3D sampler,<br>    vec4 P, float lod, ivec3 offset,<br>    inout gvec4 texel); | |
| int sparseTextureGrad(gsampler1D sampler, float P,<br>    float dPdx, float dPdy,<br>    inout gvec4 texel); | Behave as in textureGrad( ), but<br>with data returned in <texel> and a<br>status code produced as the return value<br>of the function. |
| int sparseTextureGrad(gsampler2D sampler, vec2 P,<br>    vec2 dPdx, vec2 dPdy,<br>    inout gvec4 texel); | |
| int sparseTextureGrad(gsampler3D sampler, vec3 P,<br>    vec3 dPdx, vec3 dPdy,<br>    inout gvec4 texel); | |
| int sparseTextureGrad(gsampler1DArray sampler, vec2 P,<br>    float dPdx, float dPdy,<br>    inout gvec4 texel); | |
| int sparseTextureGrad(gsampler2DArray sampler, vec3 P,<br>    vec2 dPdx, vec2 dPdy,<br>    inout gvec4 texel); | |

TABLE 6-continued

| | |
|---|---|
| int sparseTextureGrad(gsamplerCube sampler, vec3 P,<br>    vec2 dPdx, vec2 dPdy,<br>    inout gvec4 texel); | |
| int sparseTextureGrad(gsamplerCubeArray sampler, vec4 P,<br>    vec2 dPdx, vec2 dPdy,<br>    inout gvec4 texel); | |
| int sparseTextureGradOffset(gsampler1D sampler, float P,<br>    float dPdx, float dPdy, int offset,<br>    inout gvec4 texel); | Behave as in textureGradOffset( ), but with data returned in <texel> and a status code produced as the return value of the function. |
| int sparseTextureGradOffset(gsampler2D sampler, vec2 P,<br>    vec2 dPdx, vec2 dPdy, ivec2 offset,<br>    inout gvec4 texel); | |
| int sparseTextureGradOffset(gsampler3D sampler, vec3 P,<br>    vec3 dPdx, vec3 dPdy, ivec3 offset,<br>    inout gvec4 texel); | |
| int sparseTextureGradOffset(gsampler1DArray sampler, vec2 P,<br>    float dPdx, float dPdy, int offset,<br>    inout gvec4 texel); | |
| int sparseTextureGradOffset(gsampler2DArray sampler, vec3 P,<br>    vec2 dPdx, vec2 dPdy, ivec2 offset,<br>    inout gvec4 texel); | |
| int sparseTextureProjGrad(gsampler1D sampler,<br>    vec2 P, float dPdx, float dPdy,<br>    inout gvec4 texel); | Behave as in textureProjGrad( ), but with data returned in <texel> and a status code produced as the return value of the function. |
| int sparseTextureProjGrad(gsampler1D sampler,<br>    vec4 P, float dPdx, float dPdy,<br>    inout gvec4 texel); | |
| int sparseTextureProjGrad(gsampler2D sampler,<br>    vec3 P, vec2 dPdx, vec2 dPdy,<br>    inout gvec4 texel); | |
| int sparseTextureProjGrad(gsampler2D sampler,<br>    vec4 P, vec2 dPdx, vec2 dPdy,<br>    inout gvec4 texel); | |

TABLE 6-continued

```
| int sparseTextureProjGrad(gsampler3D sampler,                                |   |
|                           vec4 P,                                            |   |
|                           inout gvec4 texel);                                |   |
| int sparseTextureProjGradOffset(gsampler1D sampler, vec2 P,     | Behave as in textureProjGradOffset( ), but    |
|                                 float dPdx, float dPdy,         | with data returned in <texel> and a           |
|                                 int offset, inout gvec4 texel); | status code produced as the return value     |
|                                                                 | of the function.                             |
| int sparseTextureProjGradOffset(gsampler1D sampler, vec4 P,                  |   |
|                                 float dPdx, float dPdy,                     |   |
|                                 int offset, inout gvec4 texel);             |   |
| int sparseTextureProjGradOffset(gsampler2D sampler, vec3 P,                  |   |
|                                 vec2 dPdx, vec2 dPdy,                       |   |
|                                 ivec2 offset, inout gvec4 texel);           |   |
| int sparseTextureProjGradOffset(gsampler2D sampler, vec4 P,                  |   |
|                                 vec2 dPdx, vec2 dPdy,                       |   |
|                                 ivec2 offset, inout gvec4 texel);           |   |
| int sparseTextureProjGradOffset(gsampler3D sampler, vec4 P,                  |   |
|                                 vec3 dPdx, vec3 dPdy,                       |   |
|                                 ivec3 offset, inout gvec4 texel);           |   |
```

TABLE 7

| Syntax | Description |
|---|---|
| bool sparseTexelResident(int code); | Returns true if the texture read that produced <code> retrieved valid data, and false otherwise. |
| bool sparseTexelMinLodWarning(int code); | Returns true if the texture read that produced <code> required a texel fetch from any LOD lower than the user specified LOD warning threshold. |
| int sparseTexelLodWarningFetch(int code); | Returns the LOD calculated by the texture read that generated <code> and resulted in a condition that would cause sparseTexelMinLodWarning to return true. If the LOD warning was not encountered, this function returns zero. |

TABLE 8

| Get Value | Type | Get Command | Initial Value | Description | Sec. |
|---|---|---|---|---|---|
| MIN_LOD_WARNING_AMD | Z+ | GetTexParameteriv | 0 | User-specified minimum LOD warning level. | 3.8.6 |

TABLE 9

| Get Value | Type | Get Command | Minimum Value | Description | Sec. |
|---|---|---|---|---|---|
| MAX_SPAESE_TEXTURE_SIZE_AMD | Z+ | GetIntegerv | 16384 | Maximum 1D/2D/rectangle texture image dimension for a sparse texture. | 3.8.6 |
| MAX_SPARSE_3D_TEXTURE_SIZE_AMD | Z+ | GetIntegerv | 2048 | Maximum 3D texture image dimension for a sparse texture. | 3.8.6 |
| MAX_SPARSE_3D_TEXTURE_SIZE_AMD | Z+ | GetIntegerv | 2048 | Maximum number of layers in a sparse array texture. | 3.8.6 |

Another example method and extension is the sparse_buffer. Buffer objects are central to the operation of OpenGL. Vertex data and indices are sourced from buffer objects. Buffers may be used as backing store for constants via uniform buffers, or general data stores through buffer textures. A buffer object is a representation of a data store to be managed and used by the GL. In general, it is treated as a large, linear range of memory.

In some circumstances, large portions of a buffer object may go unused or not be necessary for particular operations. Examples include optional vertex data such as tangent vectors or additional texture coordinates. Other examples include high-LOD versions of geometry that may not be needed until a viewer approaches very close to an object.

To accommodate this type of scenario, this extension introduces the concept of a sparse buffer (partially resident buffers). Such a buffer object has an allocation in virtual address space, but need not be fully backed by physical storage. The physical backing store for the buffer object may be paged in and out under control of the host application, potentially allowing much more data to be active than will fit into local video memory. An example implementation is shown in Table 10.

TABLE 10

Accepted by the <usage> parameter of BufferData:
SPARSE_DRAW_AMD 0x????
SPARSE_READ_AMD 0x????
SPARSE_COPY_AMD 0x????
Accepted by the <pname> parameter of GetIntegerv, GetFloatv, GetDoublev, GetInteger64v, and GetBooleanv:
SPARSE_BUFFER_PAGE_SIZE_AMD 0x????

For Creating Buffer Object Data Stores see Table 11.

TABLE 11

SPARSE_DRAW_AMD  The data store contents are to be allocated in virtual space only and their physical allocation controlled through subsequent calls to TABLE 11-continued BufferSubData. The data in the store will be used by the GL as the source for drawing and image commands.
SPARSE_READ_AMD The data store contents are to be allocated in virtual space only and their physical allocation controlled through subsequent calls to BufferSubData. The data in the store will be consumed by the application.
SPARSE_COPY_AMD The data store contents are to be allocated in virtual space only and their physical allocation controlled through subsequent calls to BufferSubData. The data in the store will be both be used by the GL as a source for drawing and image commands.

If <usage> parameter is either SPARSE_DRAW_AMD, SPARSE_READ_AMD or SPARSE_COPY_AMD, the buffer's data store will be considered sparsely allocated. If <data> is NULL, storage is allocated only in virtual space and no physical data store will be allocated to back it. If <data> is non-NULL, then both virtual and physical store are allocated and the buffer's data store immediately becomes committed. Physical store for the buffer may subsequently allocated or deallocated by calling BufferSubData on a buffer object who's<usage> parameter is one of these tokens.

If the buffer's<usage> parameter is SPARSE_DRAW_AMD, SPARSE_READ_AMD or SPARSE_COPY_AMD, BufferSubData may be used to allocate and deallocate physical storage for sparsely populated buffer data stores. If <data> is not NULL, physical store for the pages of the buffer included by the range <offset>, <offset>+<size> is allocated and committed. If <data> is NULL, then any existing committed store in that range is deallocated. When BufferSubData is used with sparsely populated buffers, <offset> and <size> must be integer multiples of SPARSE_BUFFER_PAGE_SIZE_AMD, otherwise an INVALID_OPERATION error will be generated.

If the buffer's<usage> parameter is SPARSE_DRAW_AMD, SPARSE_READ_AMD or SPARSE_COPY_AMD, <offset> and <length> must be integer multiples of SPARSE_BUFFER_PAGE_SIZE_AMD, otherwise an INVALID_VALUE error is generated. If the range described by <offset> and <length> includes pages for which no physical allocation exists, one will be created that includes those pages.

Described herein are effects of accessing uncommitted pages of buffers. The effect of reading from or writing to uncommitted pages of a buffer's data store is dependent on the circumstances of that read. In most cases, behavior of reads is undefined and writes are ignored. In those cases where it is well defined, that behavior is documented in the relevant part of this specification.

If any attempt to source data from an uncommitted physical page of a buffer's data store is made, then the result of that read will be as if the vertex array was disabled. That is, the default values as specified by the VertexAttrib* commands is used in place of the data from the buffer object. Any partial read causes this behavior.

Described herein are buffer textures. If the data store associated with a buffer and accessed through a buffer texture is sparsely committed, and that access would result in a read of a non-committed physical page, the result of the access is zero. Reads that cross the boundary between committed and non-committed pages will also return zero.

Described herein are uncommitted texture images. For texel fetches from buffer textures (gsamplerBuffer), the result is well defined and is zero for any access that attempts to read from a non-committed page of the buffer. Pages are allocated in multiples of SPARSE_BUFFER_PAGE_SIZE_AMD basic machine units, as described in the OpenGL specification. The above is shown in Tables 12 and 13, (the latter also showing implementation dependent values).

TABLE 12

| Syntax | Description |
| --- | --- |
| int sparseTexelFetch(gsamplerBuffer, int P, inout gvec4 texel); | Behave as in texelFetch( ), but with data returned in texel and a status code produced as the return value of the function. |

TABLE 13

| Get Value | Type | Get Command | Minimum Value | Description | Sec. |
| --- | --- | --- | --- | --- | --- |
| SPARSE_BUFFER_PAGE_SIZE_AMD | Z+ | GetIntegerv | 1 | Page size for sparse buffers | 3.8.6 |

Another method or extension is shader_stencil_value_export. OpenGL includes stencil testing functionality that allows an application specified value, (the reference value), to be compared against the content of a stencil buffer and fragments kept or discarded based on the results of this test. In addition to updating the stencil buffer with simple operations such as inversion or incrementation, this reference value may be written directly into the stencil buffer.

AMD_stencil_operation_extended further extended the number of operations that may be performed on the stencil buffer to include logical and arithmetic operations. It also introduced a new state, the stencil operation source value, to allow these new operations to be performed on the stencil buffer using an application supplied constant value as a source value, rather than the reference value used in the stencil test.

The AMD_shader_stencil_export extension allows the reference value used for the stencil test to be generated and exported from a fragment shader. This extension provides similar functionality for the stencil operation source value, allowing it to be generated in and exported from the fragment shader. An example implementation is shown in Table 14.

TABLE 14

3.3.x GL_AMD_shader_stencil_value_export
  To use the GL_AMD_shader_stencil_value_export extension in a shader it must be enabled using the #extension directive.
  The shading language preprocessor #define GL_AMD_shader_stencil_value_export will be defined to 1 if the GL_AMD_shader_stencil_value_export extension is supported.

For Built-in Language Variables, add "out int gl_FragStencilValueAMD".

Writing to gl_FragStencilValueAMD will establish the stencil operation source value for the fragment being processed. Only the least significant bits of the integer gl_FragStencilValueAMD are considered up to the value of STENCIL_BITS and higher order bits are discarded. If stencil buffering is enabled and no shader writes to gl_FragStencilValueAMD, the fixed function value for stencil operation source will be used as the fragment's stencil operation source value. If a shader statically assigns a value to gl_FragStencilValueAMD, and there is an execution path through the shader that does not set gl_FragStencilValueAMD, then the value of the fragment's stencil operation source value may be undefined for executions of the shader that take that path. That is, if the set of linked shaders statically contain a write to gl_FragStencilValueAMD, then it is responsible for always writing it.

If a shader executes the discard keyword, the fragment is discarded, and the values of any user-defined fragment outputs, gl_FragDepth, gl_FragColor, gl_FragData, gl_FragStencilRefAMD, and gl_FragStencilValueAMD become irrelevant.

Another example method or extension is stencil_operation_extended. Stencil buffers are special buffers that allow tests to be made against an incoming value and action taken based on that value. The stencil buffer is updated during rasterization, and the operation used to update the stencil buffer is chosen based on whether the fragment passes the stencil test, and if it does, whether it passes the depth test. Traditional OpenGL includes support for several primitive operations, such as incrementing, or clearing the content of the stencil buffer, or replacing it with a specified reference value.

This extension adds support for an additional set of operations that may be performed on the stencil buffer under each circumstance. Additionally, this extension separates the value used as the source for stencil operations from the reference value, allowing different values to be used in the stencil test, and in the update of the stencil buffer. See an example implementation in Table 15.

TABLE 15

New Procedures and Functions
    void StencilOpValueAMD(enum face, uint value);
New Tokens
    Accepted by the <sfail>, <dpfail> and <dppass> parameters of
    StencilOp and StencilOpSeparate:
        SET_AMD                             0x874A
        AND                                 0x1501
        XOR                                 0x1506
        OR                                  0x1507
        NOR                                 0x1508
        EQUIV                               0x1509
        NAND                                0x150E
        REPLACE_VALUE_AMD                   0x874B
    Accepted by the <param> parameter of GetIntegerv, GetFloatv,
    GetBooleanv GetDoublev and GetInteger64v:
        STENCIL_OP_VALUE_AMD                0x874C
        STENCIL_BACK_OP_VALUE_AMD           0x874D The stencil test is controlled with <leave existing functions in place> void StencilOpValueAMD (enum face, uint value).

StencilOp and StencilOpSeparate take three arguments that indicate what happens to the stored stencil value if this or certain subsequent tests fail or pass. The term sfail indicates what action is taken if the stencil test fails. The inputs to the stencil operation are the stencil reference value, the stencil operation source value, and the current content of the stencil buffer. The accepted symbolic constants are KEEP, ZERO, SET_AMD, REPLACE, REPLACE_VALUE_AMD, INCR, DECR, INVERT, INCR_WRAP, DECR_WRAP, AND, XOR, OR, NOR, EQUIV, and NAND. These correspond to keeping the current value, setting to zero, setting to the maximum representable value, replacing with the reference value, replacing with the operation source value, incrementing by the operation source value with saturation, decrementing by the operation source value with saturation, bitwise inverting it, incrementing by the operation source value without saturation, decrementing by the operation source value without saturation, logically ANDing the operation source value value with it, logically XORing the operation source value value with it, logically ORing the operation source value with it, logically NORing the operation source value with it, logically XORing the operation source value with it and replacing the it with the logically inverted result of that computation, and logically NANDing the operation source value with it, respectively.

For purposes of increment, decrement, the stencil bits are considered as an unsigned integer. Incrementing or decrementing with saturation clamps the stencil value between 0 and the maximum representable value. Incrementing without saturation will wrap such that incrementing the content of the stencil buffer in such a way that overflow occurs will cause the result of the operation to be masked by the number of bits representable by the stencil buffer. Decrementing without saturation will wrap such that decrementing the content of the stencil buffer in a manner such that the result of the subtraction would be negative causes the two's complement result to be interpreted as an unsigned integer and masked to the number of bits representable by the stencil buffer.

The stencil operation source value is set by calling StencilOpValueAMD with <face> parameter set to GL_FRONT, GL_BACK or GL_FRONT_AND_BACK, and <value> parameter set to the new value of the stencil operation source value.

If the stencil test fails, the incoming fragment is discarded. The state required consists of the most recent values passed to StencilFunc or StencilFuncSeparate, to StencilOp or StencilOpSeparate, and to StencilOpValueAMD, and a bit indicating whether stencil testing is enabled or disabled. In the initial state, stenciling is disabled, the front and back reference values are both zero, the front and back stencil comparison functions are both ALWAYS, the front and back stencil mask are both set to the value 2^S−1, where S is greater than or equal to the number of bits in the deepest buffer supported by the GL implementation, and the front and back stencil operation values are both 1. Initially, all three front and back stencil operations are KEEP. See an example implementation in Table 15. The stencil_operation_extended extension allows complex operations to be performed as shown, for example, in Tables 16 and 17.

TABLE 16

| Get Value | Get Type | Get Command | Initial Value | Description | Sec. |
|---|---|---|---|---|---|
| STENCIL_FAIL | Z16 | GetIntegerv | KEEP | Front stencil fail action | 4.1.4 |
| STENCIL_PASS_DEPTH_FAIL | Z16 | GetIntegerv | KEEP | Front stencil depth buffer fail action | 4.1.4 |
| STENCIL_PASS_DEPTH_PASS | Z16 | GetIntegerv | KEEP | Front stencil depth buffer pass action | 4.1.4 |
| STENCIL_BACK_FAIL | Z16 | GetIntegerv | KEEP | Back stencil fail action | 4.1.4 |

TABLE 16-continued

| | | | | | |
|---|---|---|---|---|---|
| STENCIL_BACK_PASS_DEPTH_FAIL | Z16 | GetIntegerv | KEEP | Back stencil depth buffer fail action | 4.1.4 |
| STENCIL_BACK_PASS_DEPTH_PASS | Z16 | GetIntegerv | KEEP | Back stencil depth buffer pass action | 4.1.4 |
| STENCIL_OP_VALUE_AMD | Z+ | GetIntegerv | 1 | Front stencil operation value | 4.1.4 |
| STENCIL_BACK_OP_VALUE_AMD | Z+ | GetIngeterv | 1 | Back stencil operation value | 4.1.4 |

----
Dependencies on EXT_stencil_wrap
    If EXT_stencil_wrap is not supported, remove references to INCR_WRAP and
    DECR_WRAP. Also, change the definition of the STENCIL_{*} state to Z14
    rather than Z16.
----
Dependencies on OpenGL 2.0
    If the GL version is less than 2.0, remove all references to
    StencilOpSeparate. Furthermore, the <face> parameter to StencilOpValueAMD
    must be FRONT_AND_BACK, otherwise an INVALID_ENUM error will be generated.

TABLE 17

```
if ( S != R )
{
    if ( depth_pass )
        S |= front_facing ? V1 : V2;
    else
        S &= front_facing ? V1 : V2;
}
Where S is the stencil buffer content, R is the reference value, and V1
and V2 are the update values
glStencilOp(GL_KEEP, GL_OR_AMD, GL_AND_AMD);
glStencilFunc(GL_NOT_EQUAL, R, ~0);
glStencilOpValueAMD(GL_FRONT, V1);
glStencilOpValueAMD(GL_BACK, V2);
```

Another example method and extension is transform_feedback4 for the geometry shader. Transform feedback is a mechanism to record the output of the geometry shader into one or more buffers for further processing, recursive rendering or read-back by the client. ARB_transform_feedback3 (and OpenGL 4.0) extended the transform feedback subsystem to allow multiple streams of primitive information to be captured. However, it imposed a limitation that the primitive type for all streams must be POINTS if more than one stream is to be captured. AMD_transform_feedback3_lines_triangles relaxed that restriction to allow lines or triangles to be captured, in the case where multiple streams are to be captured. However, it still required that all streams share the same primitive type. Additionally, with all current extensions to transform feedback, only a single primitive stream may be rasterized.

This extension enhances transform feedback in two significant ways. First, it allows multiple transform feedback streams to be captured, each with its own, independent primitive type. Second, it allows any combination of streams to be rasterized. As an example, this enables the geometry shader to take a single stream of triangle geometry and emit filled triangles with a wireframe outline and a point at each vertex, all in a single pass through the input vertices. In another example, it allows rasterization of triangles in one stream and recording points in another. Combined with features such those provided by ARB_viewport_array, layered rendering, shader subroutines and so on, an application can render several views of its geometry, each with a radically different style, all in a single pass. See example tokens in Table 18.

TABLE 18

New Tokens
    Accepted by the <pname> parameter of Enablei, Disablei and

TABLE 18-continued

IsEnabledi:
    STREAM_RASTERIZATION_AMD    0x91A0

The primitives emitted to all vertex streams are passed to the transform feedback stage to be captured and written to buffer objects in the manner specified by the transform feedback state. The primitives emitted to vertex streams for which rasterization is enabled are then passed to subsequent pipeline stages for clipping, rasterization, and subsequent fragment processing.

Geometry shaders that emit vertices to multiple vertex streams may generate a different primitive on each stream. Any combination of streams may be rasterized. This allows a geometry shader to transform a single input vertex stream into multiple primitives of different types, all of which may be rasterized. For example, each stream can have its own primitive mode, such as POINTS, LINES or TRIANGLES. In some embodiments, four streams are exposed as output from the geometry shader.

Described herein are discarding primitives before rasterization. Primitives sent to any vertex stream may be processed further. When geometry shaders are disabled, all vertices are considered to be emitted to stream zero. Primitives can be optionally discarded before rasterization but after the optional transform feedback stage. All primitives may be discarded by calling Enable with RASTERIZER_DISCARD. When enabled, primitives emitted to any stream are discarded. When enabled, RASTERIZER_DISCARD also causes the Clear and ClearBuffer* commands to be ignored. When RASTERIZER_DISCARD is disabled, primitives emitted on streams for which rasterization is enabled are passed through to the rasterization stage to be processed normally. Rasterization for specific streams may be enabled by calling Enablei, (or disabled by calling Disablei), with the constant STREAM_RASTERIZATION_AMD and the index of the selected stream. Initially, rasterization is enabled for stream zero and is disabled for all other streams.

If primitives are emitted on more than one stream for which rasterization is enabled, the order of rasterization of primitives on different streams is undefined. However, it is guaranteed that all primitives emitted on a single stream are rasterized in the order in which they are generated, and that all primitives generated by a single invocation of a geometry shader are rasterized in stream order, starting with the lowest numbered stream.

The built-in read-only variable gl_StreamID contains the index of the vertex stream from which the vertices forming the primitive currently being rasterized were taken. User defined input varying variables belonging to this stream have defined values; whilst all user defined other input variables are undefined. When no geometry shader is active, gl_StreamID is zero. When a geometry shader is active and writes to multiple output vertex streams for which rasterization is enabled, gl_StreamID may range from zero to the value of MAX_VERTEX_STREAMS−1.

The identifier <stream> parameter is used to specify that a fragment shader input variable or block is associated with a particular vertex stream, (numbered beginning with zero).

A default stream number may be declared at global scope by qualifying interface qualifier out as in this example: layout (stream=1) in. The stream number specified in such a declaration replaces any previous default and applies to all subsequent block and variable declarations until a new default is established. The initial default stream number is zero.

Each input block or non-block input variable is associated with a vertex stream. If the block or variable is declared with the <stream> identifier, it is associated with the specified stream; otherwise, it is associated with the current default stream. A block member may be declared with a stream identifier, but the specified stream must match the stream associated with the containing block. An example implementation is shown in Table 19.

TABLE 19

```
layout(stream=1) in;           // default is now stream 1
    out vec4 var1;             // var1 belongs to default stream (1)
    layout(stream=2) in Block1 {        // "Block1" belongs to stream 2
        layout(stream=2) vec4 var2;     // redundant block member stream decl
        layout(stream=3) vec2 var3;     // ILLEGAL (must match block stream)
        vec3 var4;             // belongs to stream 2
    };
    layout(stream=0) in;       // default is now stream 0
    in vec4 var5;              // var5 belongs to default stream (0)
    in Block2 {                // "Block2" belongs to default stream (0)
        vec4 var6;
    };
    layout(stream=3) in vec4 var7;      // var7 belongs to stream 3
```

Each fragment processed by the fragment shader receives its input variables from a specific stream corresponding to the stream upon which the source vertices were emitted in the geometry shader. Each invocation of the fragment shader processes a fragment belonging to a primitive generated from vertices emitted to a single stream. The index of the stream to which these vertices belong is available in the built-in variable gl_StreamID. Only those input variables belonging to the current stream have defined values. Reading from a variable belonging to any other stream may cause undefined behavior, including program termination.

Add to the built-in variables the variable in int gl_StreamID. The input variable gl_StreamID indicates the vertex stream from which vertices were taken to generate the primitive to which the current fragment belongs. This information may be used to deduce which of the fragment shader input variables contain defined values. Reading from input variables belonging to a vertex stream other than that indicated by gl_StreamID may produce undefined behavior, possibly including application termination. A part of an example implementation is shown in Table 20.

TABLE 20

| | | | | | |
|---|---|---|---|---|---|
| | | | Rasterization | | |
| Get Value | Type | Get Command | Initial Value | Description | Sec. |
| STREAM_RASTERIZATION_AMD | nxB | GetBoolean | See 3.1 | Per stream rasterizer enable | 3.1 |

Another example method and extension is transform_feedback3_lines_triangles. OpenGL 4.0 introduced the ability to record primitives into multiple output streams using transform feedback. However, the restriction that all streams must output POINT primitives when more than one output stream is active was also introduced. This extension removes that restriction, allowing the same set of primitives to be used with multiple transform feedback streams as with a single stream.

Geometry shaders that emit vertices into multiple vertex streams are currently limited to using the same output primitive type on all streams. A program will fail to link if it includes a geometry shader that calls the EmitStreamVertex built-in function and has two or more output streams with different primitive types.

Another example method and extension is vertex_shader_layer. The gl_Layer built-in shading language variable was introduced with the ARB_geometry_shader extension and subsequently promoted to core OpenGL in version 3.2. This variable is an output from the geometry shader stage that allows rendering to be directed to a specific layer of an array texture, slice of a 3D texture or face of a cube map or cube map array attachment of the framebuffer. Thus, this extremely useful functionality is only available if a geometry shader is present—even if the geometry shader is not otherwise required by the application. This adds overhead to the graphics processing pipeline, and complexity to applications. It also precludes implementations that cannot support geometry shaders from supporting rendering to layered framebuffer attachments.

This extension exposes the gl_Layer built-in variable in the vertex shader, allowing rendering to be directed to layered framebuffer attachments with only a vertex and fragment shader present. Combined with features such as instancing, or static vertex attributes and so on, this allows a wide variety of techniques to be implemented without the requirement for a geometry shader to be present.

The built-in special variable gl_Layer, if written, holds the layer to which rendering should be directed and is described herein below. Described herein is layered rendering. Vertex shaders can be used to render to one of several different layers of cube map textures, three-dimensional textures, or one- or two-dimensional texture arrays. This functionality allows an application to bind an entire complex texture to a framebuffer object, and render primitives to arbitrary layers computed at run time. For example, it can be used to project and render a scene onto all six faces of a cube map texture in one pass. The layer to render to is specified by writing to the built-in output variable gl_Layer. Layered rendering requires the use of framebuffer objects.

The special built-in variable gl_Layer is available to geometry shaders to direct rendering to a specific layer of a layered framebuffer attachment and has the same effect as the similarly named variable in the vertex shader.

Otherwise, the layer for each point, line or triangle generated by primitive assembly, or emitted by the geometry shader (if present) is taken from the gl_Layer output of one of the vertices of the primitive. The vertex used is implementation-dependent. To obtain defined results, all vertices of a single primitive, (including strips, fans and loops), should receive the same value for gl_Layer. When a geometry shader is present, since the EndPrimitive built-in function starts a new output primitive, defined results can be achieved if EndPrimitive is called between two vertices emitted with different layer numbers. A layer number written by a vertex or geometry shader has no effect if the framebuffer is not layered.

The output variable gl_Layer is available only in the vertex and geometry languages, and is used to select . . . . See section 2.11.11, "Shader Exection" (under "Shader Outputs") and section 4.4.7, "Layered Framebuffers" in the OpenGL Graphics System for more information.

Should a vertex shader write to gl_Layer when a geometry shader is present, this value will be discarded and the value written to gl_Layer by the geometry shader (if any) will be used instead. If the geometry shader does not write to gl_Layer, layer zero will be assumed. If selection of layer by the vertex shader is desired in the presence of a geometry shader, the layer should be communicated from the vertex shader to the geometry shader via a user defined varying per-vertex and the geometry shader used to copy the appropriate value to the gl_Layer output variable.

If geometry shaders are not supported, remove all references to geometry shaders. gl_Layer is still introduced in the vertex shader. However, layered framebuffer attachments were also introduced with geometry shaders, and so this extension is of limited use. In order to expose this extension on an implementation that does not support geometry shaders in a meaningful way, it may be necessary to introduce an extension that adds layered framebuffer attachments alone.

Another example method and extension is vertex_shader_viewport_index. The gl_ViewportIndex built-in variable was introduced by the ARB_viewport_array extension and OpenGL 4.1. This variable is available in un-extended OpenGL only to the geometry shader. When written in the geometry shader, it causes geometry to be directed to one of an array of several independent viewport rectangles.

In order to use any viewport other than zero, a geometry shader must be present. Geometry shaders introduce processing overhead and potential performance issues. This extension exposes the gl_ViewportIndex built-in variable to the vertex shader, allowing the functionality introduced by ARB_viewport_array to be accessed without requiring a geometry shader to be present. The built-in special variable gl_ViewportIndex, if written, is used to direct rendering to one of several viewports and is described herein below.

Described herein is viewport selection. Vertex shaders can be used to render to one of several different viewport rectangles. The destination viewport rectangle for a primitive may be specified by writing to the built-in output variable gl_ViewportIndex in the vertex shader. This functionality allows a vertex shader to direct rendering to one of several viewport rectangles. The specific vertex of a primitive from which gl_ViewportIndex is taken is implementation defined and may be determined by calling GetIntegery with the symbolic constant VIEWPORT_INDEX_PROVOKING_VERTEX. If the value returned is PROVOKING_VERTEX then vertex selection follows the convention specified to ProvokingVertex (see Section 2.19). If the value returned is FIRST_VERTEX_CONVENTION, selection is always taken from the first vertex of the primitive. If the value returned is LAST_VERTEX_CONVENTION, the selection is always taken from the last vertex of the primitive. If the value returned is UNDEFINED_VERTEX, the selection is not guaranteed to be taken from any specific vertex. The vertex considered the provoking vertex for particular primitive types is given in table 2.15.

The special built-in variable gl_ViewportIndex is available to geometry shaders to direct rendering to a specific viewport in an array of viewports and has the same effect as the similarly named variable in the vertex shader.

Multiple viewports are available and are numbered zero through the value of MAX_VIEWPORTS minus one. If a vertex or geometry shader is active and writes to gl_ViewportIndex, the viewport transformation uses the viewport corresponding to the value assigned to gl_ViewportIndex taken from an implementation-dependent primitive vertex. If the value of the viewport index is outside the range zero to the value of MAX_VIEWPORTS minus one, the results of the viewport transformation are undefined. If the active vertex shaders or geometry shaders (if present) do not write to gl_ViewportIndex, the viewport numbered zero is used by the viewport transformation.

Add to the list of vertex shader built-in variables out int gl_ViewportIndex. The output variable gl_ViewportIndex is available only in the vertex and geometry languages and provides the index of the viewport to which the next primitive assembled from the resulting vertices or emitted from the geometry shader (if present) should be drawn. Primitives generated during primitive assembly will undergo viewport transformation and scissor testing using the viewport transformation and scissor rectangle selected by the value of gl_ViewportIndex. The viewport index used will come from one of the vertices in the primitive being processed. However, which vertex the viewport index comes from is implementation-dependent, so it is best to use the same viewport index for all vertices of the primitive. If a vertex or geometry shader (if present) does not assign a value to gl_ViewportIndex, viewport transform and scissor rectangle zero will be used. If a vertex or geometry shader statically assigns a value to gl_ViewportIndex and there is a path through the shader that does not assign a value to gl_ViewportIndex, the value of gl_ViewportIndex is undefined for executions of the shader that take that path. See section 2.11.11, under "Output Variables" of the OpenGL Graphics System Specification (Core Profile) for more information.

Another example method or extension is pinned_memory. This extension defines an interface that allows improved control of the physical memory used by the graphics device. It allows an existing page of system memory allocated by the application to be used as memory directly accessible by the graphics processor. One example application of this functionality would be to avoid an explicit synchronous copy with a sub-system of the application. For instance, it is possible to directly draw from a system memory copy of a video image. In sum, it is a zero copy extension and allows application memory to be addressed by the processor. An example of tokens used in an implementation is shown in Table 21.

TABLE 21

New Tokens
    Accepted by the <target> parameters of BindBuffer, BufferData,
    BufferSubData, MapBuffer, UnmapBuffer, GetBufferSubData,
    GetBufferParameteriv, GetBufferPointerv, MapBufferRange:
        EXTERNAL_VIRTUAL_MEMORY_BUFFER_AMD    0x9160

----

Buffer object binding targets.

| Target name | Purpose | Described in section(s) |
| --- | --- | --- |
| EXTERNAL_VIRTUAL_MEMORY_BUFFER_AMD | Application-owned memory buffer | 2.9.2 |

Sample implementation:
void * chunk_o_memory = malloc(lots);
GLuint buffer;
glGenBuffers(1, &buffer);
glBindBuffer(GL_EXTERNAL_VIRTUAL_MEMORY_AMD, buffer);
glBufferData(GL_EXTERNAL_VIRTUAL_MEMORY_AMD, lots, chunk_o_memory, <whatever>);

Described herein is creating buffer object data stores. The data store of a buffer object is created and initialized by calling void BufferData(enum target, sizeiptr size, const void *data, enum usage); with <target> set to one of the targets listed in table 2.8, <size> set to the size of the data store in basic machine units, and data pointing to the source data in client memory. If <target> is not EXTERNAL_VIRTUAL_MEMORY_BUFFER_AMD, then if <data> is non-null, the source data is copied to the buffer object's data store. If <data> is null, then the contents of the buffer object's data store are undefined. If <target> is EXTERNAL_VIRTUAL_MEMORY_BUFFER_AMD, then the client's memory is used directly by the GL for all subsequent operations on the buffer object's data store. In this case, the application must guarantee the existence of the buffer for the lifetime of the buffer object, or until its data store is re-specified by another call to BufferData. <usage> is specified as one of nine enumerated values, indicating the expected application usage pattern of the data store.

The GL_EXTERNAL_VIRTUAL_MEMORY_BUFFER_AMD target is used simply for the purposes of allocation through BufferData. It is otherwise not referenced by the GL (much like GL_COPY_READ_BUFFER, for example). Once the buffer's data store has been associated with client memory, that memory may be used for any purpose such as vertex attributes (GL_ARRAY_BUFFER), TBO (GL_TEXTURE_BUFFER), pixel reads and writes (GL_PIXEL_UNPACK_BUFFER, GL_PIXEL_PACK_BUFFER) or transform feedback (GL_TRANSFORM_FEEDBACK_BUFFER). An example is shown in Table 22.

TABLE 22

```
asynchronous pixel readback to client memory:
    GLuint buffer;
    glGenBuffers(1, &buffer);
    glBindBuffer(GL_EXTERNAL_VIRTUAL_MEMORY_BUFFER_AMD, buffer);
    void * memory = malloc(1024 * 1024);
    glBufferData(GL_EXTERNAL_VIRTUAL_MEMORY_BUFFER_AMD, 1024 * 1024, GL_STREAM_COPY, memory);
    glBindBuffer(GL_EXTERNAL_VIRTUAL_MEMORY_BUFFER_AMD, 0);
    glBindBuffer(GL_PIXEL_BUFFER_AMD, buffer);
    glReadPixels(0, 0, width, height, GL_RGBA, GL_UNSIGNED_BYTE, 0);
    GLsync s = glFenceSync(GL_SYNC_GPU_COMMANDS_COMPLETE);
    // Data will eventually end up in 'memory'. Other processing may occur
    // during the transfer time.
    glClientWaitSync(s);
        // It is now safe to use 'memory'
```

Described herein is the GL_AMD-multi_draw-indirect extension. This extension adds the concept of multiple Draw*Indirect functions. This may be used to generate disjoint draw-lists on the GPU using transform feedback or on the CPU in preprocessor, scene traversal, physics, visibility and the like, for example. An example implementation is shown in Table 23.

TABLE 23

```
void glMultiDrawArraysIndirectAMD(GLenum mode, const GLvoid
*indirect,GLsizei indirectcount, GLsizei stride);
void glMultiDrawElementsIndirectAMD(GLenum mode, GLenum type,
                    const GLvoid *indirect,
                    GLsizei indirectcount,
GLsizei stride);
Where indirect is as an array of indirectcount commands, stride
bytes apart
```

In general, in accordance with some embodiments, a method for graphics processing includes receiving a texture object including texture data and reserving processor address space for the texture data with uncommitted physical memory responsive to an allocation command including a sparse texture flag associated with the texture object. In some embodiments, the physical memory may be committed for the texture data responsive to an image command. The physical memory is committed on a condition that texture data is present and decommitted on a condition that texture data is absent. In some embodiments, the physical memory may decommitted responsive to a second allocation command. In some embodiments, a commitment region is integer multiples of virtual page size in each dimension.

In accordance with some embodiments, a method for graphics processing includes capturing multiple transform feedback streams from a shader for a single input stream. Each of the multiple transform feedback streams may have an independent primitive type. In some embodiments, each primitive type is different. Any combination of the multiple transform feedback streams may be rasterized. In some embodiments, the multiple views may be rendered based on rasterization of the multiple transform feedback streams for the single input stream.

In accordance with some embodiments, a method for graphics processing includes providing a reference value and a source value. A stencil buffer content is then compared against one of the reference value and a source value. A fragment is processed based on comparing the stencil buffer content against one of the reference value and a source value. The stencil buffer content is operated or acted upon with one of the reference value and the source value based on a comparing the stencil buffer content against one of the reference value and a source value. In some embodiments, the source value is generated in a fragment shader.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the present invention.

In addition to the above description included herein is Appendix A that includes additional description of methods for enabling graphics features in processors.

The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for graphics processing, comprising:
storing stencil buffer values in a stencil buffer;
generating a reference value in a fragment shader;
comparing the stencil buffer values against the reference value generated by
processing a fragment based on the comparing; and
operating on the stencil buffer values based on a combination of the stored stencil buffer values, the reference value, and the source value, the operating including modifying the stencil buffer based on one of the reference value or the source value using an operation selection value that selects one of the source value and the reference value for the operating, wherein the operating includes any one or a combination of: keeping a stencil buffer value; setting a stencil buffer value to zero; setting a stencil buffer value to a maximum representable value; replacing a stencil buffer value with the reference value; replacing a stencil buffer value with the source value; incrementing a stencil buffer value by the source value with saturation; decrementing a stencil buffer value by the source value with saturation; bitwise inverting a stencil buffer value; incrementing a stencil buffer value by the source value without saturation such that decrementing the stencil buffer value causes a result of the operation to be masked by a number of bits representable by the stencil buffer; decrementing a stencil buffer value by the source value without saturation; logically ANDing a stencil buffer value and the source value; logically XORing a stencil buffer value and the source value; logically ORing a stencil buffer value and the source value; logically NORing a stencil buffer value and the source value; logically XORing a stencil buffer value and the source value; and replacing a stencil buffer value with a logically inverted result of logically XORing a stencil buffer value and the source value; and logically NANDing a stencil buffer value and the source value.

2. The method of claim 1, wherein incrementing and decrementing with saturation clamps the stencil buffer value between 0 and the maximum representable value.

3. The method of claim 1, wherein decrementing without saturation is performed such that decrementing the stencil buffer value causes the result of the operation to be masked by a number of bits representable by the stencil buffer.

4. The method of claim 1, wherein the stencil buffer values are unsigned integers.

5. The method of claim 1, wherein the processing includes discarding the fragment.

6. A system, comprising:
a stencil buffer configured to store stencil buffer values; and
a processor configured to:
generate a reference value in a fragment shader;
compare the stencil buffer values against the reference value generated by the fragment shader or a source value supplied by an application;
process a fragment based on the comparing; and
operate on the stencil buffer values based on a combination of the stored stencil buffer values, the reference value, and the source value, the operating including modifying the stencil buffer based on one of the reference value or the source value using an operation selection value that selects one of the source value and the reference value for the operating, wherein the operating includes any one or a combination of the following operations: keeping a stencil buffer value; setting a stencil buffer value to zero; setting a stencil buffer value to a maximum representable value; replacing a stencil buffer value with the reference value; replacing a stencil buffer value with the source value; incrementing a stencil buffer value by the source value with saturation; decrementing a stencil buffer value by the source value with saturation; bitwise inverting a stencil buffer value; incrementing a stencil buffer value by the source value without saturation such that incrementing the stencil buffer value causes a result of the operation to be masked by a number of bits representable by the stencil buffer; decrementing a stencil buffer value by the source value without saturation such that decrementing the stencil buffer value causes the result of the operation to be masked by a number of bits representable by the stencil buffer; logically ANDing a stencil buffer value and the source value; logically XORing a stencil buffer value and the source value; logically ORing a stencil buffer value and the source value; logically NORing a stencil buffer value and the source value; logically XORing a stencil buffer value and the source value; and replacing a stencil buffer value with a logically inverted result of logically XORing a stencil buffer value and the source value; and logically NANDing a stencil buffer value and the source value.

7. The system of claim 6, wherein incrementing and decrementing with saturation clamps the stencil buffer value between 0 and the maximum representable value.

8. The system of claim 6, wherein decrementing without saturation is performed such that decrementing the stencil buffer value causes the result of the operation to be masked by a number of bits representable by the stencil buffer.

9. The system of claim 6, wherein the stencil buffer values are unsigned integers.

10. The system of claim 6, wherein the processing includes discarding the fragment.

* * * * *